United States Patent [19]

Kinney

[11] Patent Number: 4,988,251

[45] Date of Patent: Jan. 29, 1991

[54] MULTIPLE LOAD STORAGE RACK STRUCTURE

[75] Inventor: Thomas R. Kinney, Crete, Ill.

[73] Assignee: Interlake, Inc., Oak Brook, Ill.

[21] Appl. No.: 334,185

[22] Filed: Apr. 6, 1989

Related U.S. Application Data

[63] Continuation of Ser. No. 112,039, Oct. 21, 1987, abandoned, which is a continuation-in-part of Ser. No. 860,153, May 6, 1986, abandoned.

[51] Int. Cl.$^5$ ................................................ A47F 5/00
[52] U.S. Cl. .................................... 414/276; 211/151; 414/286
[58] Field of Search ............... 414/276, 286, 267; 211/151, 162; 248/420, 429, 430; 193/35 R, 35 TE

[56] References Cited

U.S. PATENT DOCUMENTS

| | | | |
|---|---|---|---|
| 4,227,466 | 10/1980 | Rooklyn | 211/151 X |
| 4,304,521 | 12/1981 | Hammond | 414/276 X |
| 4,341,313 | 7/1982 | Doring | 414/276 X |
| 4,462,500 | 7/1984 | Konstant et al. | 414/276 X |
| 4,613,270 | 9/1986 | Konstant et al. | 414/276 |
| 4,687,404 | 8/1987 | Seiz et al. | 414/276 |

FOREIGN PATENT DOCUMENTS

| | | | |
|---|---|---|---|
| 2400871 | 7/1974 | Fed. Rep. of Germany | 414/267 |
| 1030265 | 7/1983 | U.S.S.R. | 211/151 |

Primary Examiner—Frank E. Werner
Attorney, Agent, or Firm—Allegretti & Witcoff, Ltd.

[57] ABSTRACT

A multiple depth storage structure includes tilted, parallel rail assemblies in a storage bay. A first, single depth rail of each assembly is rollably mounted on a second, double depth rail, which is rollably mounted on a third, triple depth, fixed rail. Outer rail assemblies, having an upper outer rail rollably mounted on a lower outer rail, may be located outwardly adjacent each rail assembly. A first load is placed on cross supports joining the upper outer rails, if so equipped. Loads are successively accepted on the first rails, forward depth of the second rails, and forward depth of the third rails. Successive loads push back previous loads, and removal of each load causes positioning of the remaining loads and the rails for facile removal of a previous load or acceptance of a next load.

11 Claims, 4 Drawing Sheets 4,988,251

MULTIPLE LOAD STORAGE RACK STRUCTURE

This application is a continuation of application Ser. No. 112,039, filed Oct. 21, 1987, which is a continuation-in-part of application Ser. No. 860,153, filed May 6, 1986 both now abandoned.

BACKGROUND OF THE INVENTION

This invention relates to material handling and storage systems, and storage mechanisms therefor. More particularly, this invention relates to multiple location storage rack structures and mechanisms for positioning loads in such structures.

Material handling and storage has been a progressively more sophisticated industry since shortly after World War II. Today, computer aided and automated storage and retrieval warehouses rise multiple stories. The Interlake Companies, Inc. has been a leader in the art of such warehouses. However, for a variety of reasons, most warehouses continue to involve the manual operation of fork lift trucks carrying loads on pallets.

In the art of such warehouses, strides have been made toward maximizing density of storage without sacrificing accessibility. In addition to standard, single load depth rack, The Interlake Companies, Inc. has designed both a drive-in rack and a gravity-flow rack and mechanism. The drive-in rack includes storage bays wide enough for fork lift trucks to drive into the bays. Loads are supported by rails along the sides of the bays, rather than shelf beams across the bays. The gravity-flow rack and mechanism includes beam supported rails which incorporate series of load supporting and conveying wheels. The rails are tilted, and smooth surfaced trays are placed under pallets, such that the palletized loads roll by gravity from their place of entry toward the opposite, and exit, side of the rack. The trays are placed under the pallets to eliminate obstruction of the system caused by the roughly constructed pallets failing to travel smoothly over the rail wheels.

For some applications, standard rack, drive-in rack, and gravity-flow rack all have disadvantages. The standard rack has the common disadvantage of waste of floor space for multiple aisles. Drive-in rack overcomes the disadvantage of waste of floor space, but reduces accessibility to loads. Drive-in rack is most suitable for storage of large volumes of loads such that all loads in a bay are identical. Accessibility to any one load is then not a concern. Gravity-flow rack requires storage trays, and each tray must be separately removed from the wheeled rails when its load is removed. The trays must then be returned to the place of load entry. Moreover, in a gravity flow rack, loads are loaded and removed from opposite sides of the rack rather than from a common side. The need to provide, remove and return storage trays, and the lack of a common side of loading and removal, are often disadvantages.

SUMMARY OF THE INVENTION

An object of the inventor of the present invention was to fill a need for a storage structure which makes efficient use of floor space; which keeps loads accessible as in a gravity flow system, and which simultaneously provides a common side of load entry and removal.

Another object was to accomplish the foregoing with typical rough pallets, without obstructions and without trays.

Other objects were to accomplish all the foregoing in a multiple location storage bay and mechanism which is economical of manufacture, readily installed and reliable.

These and other important objects were achieved by the invention, which is in a principal aspect a storage rack structure having at least one bay of at least three load depths and positions. Load supporting rail assemblies of the structure include at least three rails each. The rail assemblies are positioned in parallel, at least in pairs. A first, upper rail has a length of at least one load depth. A second, middle rail has a length of at least two load depths. A third, lower rail has a length of at least three load depths, and is fixed within the rack structure. The first, upper rail is movably mounted on the second, middle rail, which is movably mounted on the third, lower rail. All rails are tilted toward the front of the structure.

In addition, a second embodiment of the invention comprises additional outer rail assemblies placed parallel to and outside of the first load supporting rail assemblies. The outer rail assemblies include at least an upper outer rail having a length of at least one load depth and a lower outer rail having a length of at least four load depths. In the second preferred embodiment, the upper, outer rail is movably mounted on the lower outer rail, which is fixed within the rack structure. Alternatively, the upper outer rail may be movably mounted on a middle outer rail having a length of at least two load depths. The middle outer rail is then movably mounted on the lower outer rail, which preferably has a length of at least five load depths. All outer rails are also tilted toward the front of the structure.

In using the first embodiment, a first load is placed on the upper rails. A second load is used to push the first load back. As the first load is pushed, the first rails move back along the second rails. The second load is placed on the exposed, forward part of the second rails. The third load pushes back both the first and second loads, and pushes back the first and second rails. The third load is placed on the exposed, forward part of the third rails.

Removal of the third load allows the second rails to move forward by gravity, positioning the second load for removal. Removal of the second load allows the first rails and first load to move forward, also by gravity.

In using the second preferred embodiment, a first load is placed on the upper outer rails. A second load is used to push back the first load. As the first load is pushed, the upper outer rails move back along the lower outer rails. The second load is placed on the exposed first rails. Third and fourth loads may be added and removed as with the first preferred embodiment.

The invention as described has the advantages of sophisticated simplicity, lightness of weight, economy of materials, and ease of installation, among others.

These and other objects, advantages and aspects of the invention are best appreciated by a reading of the detailed description of the preferred embodiments, provided hereafter.

BRIEF DESCRIPTION OF THE DRAWING

The preferred embodiments will be described hereafter, with reference to the accompanying drawing. Briefly, the drawing includes four figures, as follows.

DETAILED DESCRIPTION OF THE PREFERRED EMBODIMENT

Figure 1:
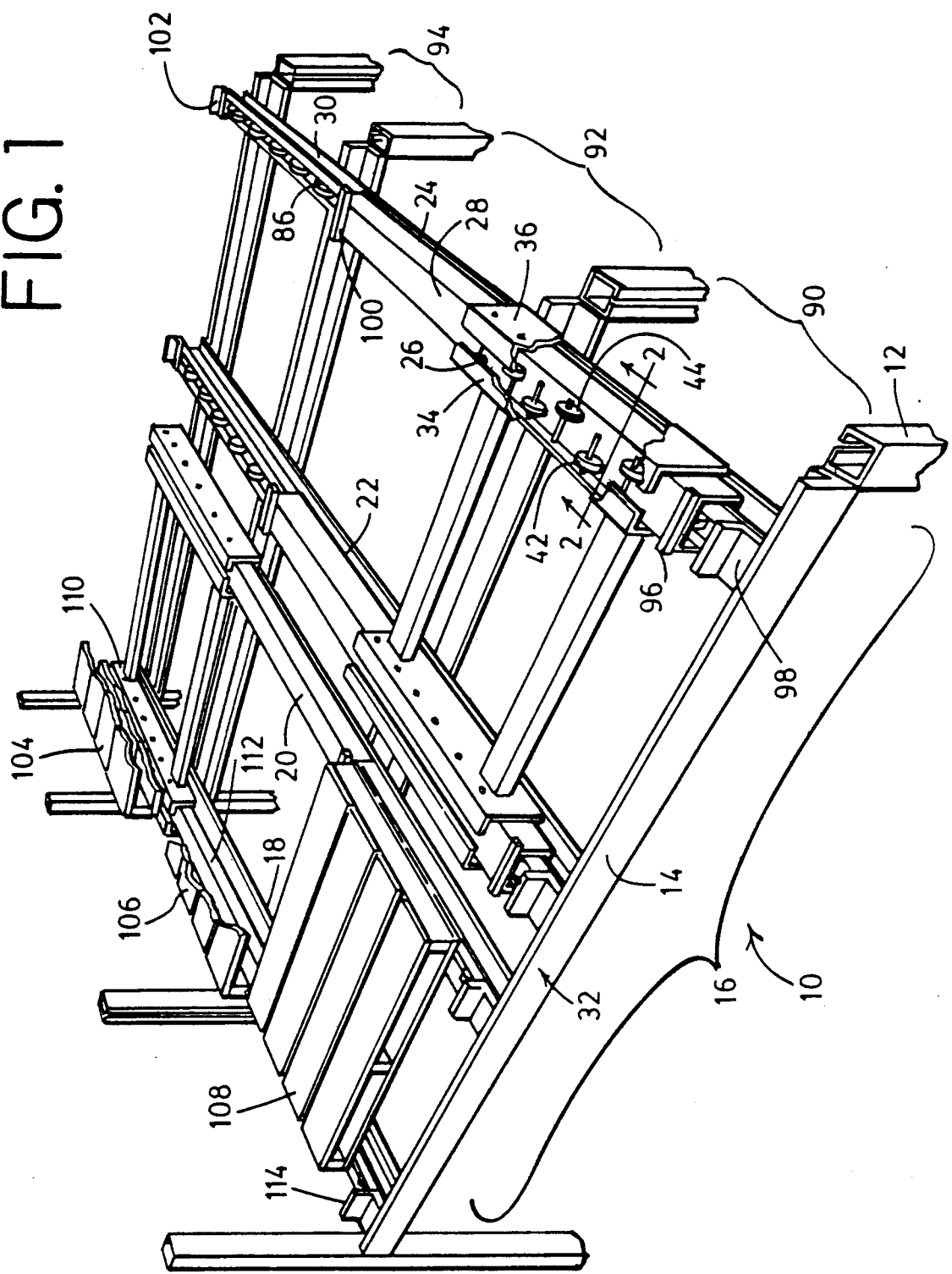
FIG. 1 is a perspective view of a first preferred embodiment of the invention. One preferred mechanism of the first preferred embodiment is shown in use with pallets, some of the pallets being cut away to reveal mechanism detail. Another preferred mechanism of the first preferred embodiment is shown ready for receiving loads with a portion of the mechanism being cut away to reveal internal detail.

Referring to FIG. 1, the first preferred embodiment 20 of the present invention is a storage rack structure exemplified by structure 10. The structure 10 comprises a plurality of rack posts such as 12, beams such as 14, and other rack support members such as cross braces (not shown) necessary to compose a self-supporting rack system. All components are of steel for heavy industrial use. The structure 10 defines a storage bay 16 having a three load depth, a two load width and a one load height. The first preferred embodiment is a plurality of structures 10 organized to form a multiple bay, multiple load height rack system suitable to fill a warehouse, or at least a major portion of a warehouse.

Within the bay 16, in the exemplary structure 10, a plurality of rail assemblies 18, 20, 22, 24 are supported on and by the beams such as 14. All assemblies 18, 20, 22, 24 are preferably identical. The rail assemblies are generally horizontally disposed (see below), are integral components and supports of the rack structure 10, and are arranged two per load width. Taking a pair of assemblies 22, 24 as exemplary, the assemblies 22, 24 are parallel to each other.

A typical assembly 24 includes a first, upper rail 26; a second, middle rail 28; and a third, lower rail 30. The first rail 26 is mounted atop the second rail 28, and the second rail 28 is mounted atop the third rail 30. The first rail 26 is movable relative to the second rail; the second rail 28 is movable relative to the third rail. The first rail 26 has a single load depth or length. The second rail 28 has a double load depth or length. The third rail has a treble load depth or length, and extends from the load entry and removal area or side 32 of the structure 10 through all load positions to the back of the third load position.

Figure 2:
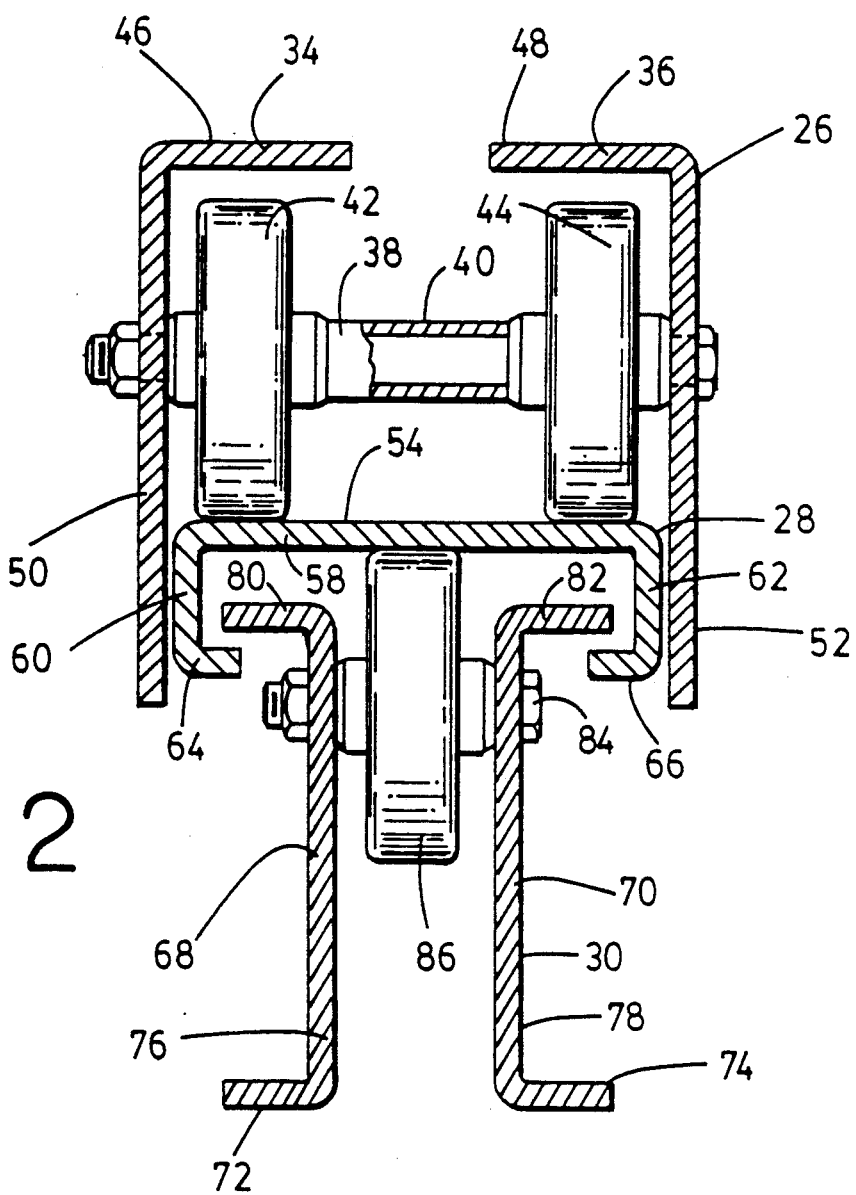
FIG. 2 is a cross-sectional view of a mechanism of the first preferred embodiment, taken along line 2—2 in FIG. 1.

Referring primarily to FIG. 2, the first rail 26 includes two elongated, mirror-image channel members 34, 36 joined by a plurality of wheel axles 38 and spacers 40. As shown in FIG. 1, the channel members 34, 36 are elongated and parallel to each other and to the other rails 28, 30. The wheel axles 38 and spacers 40 extend in a series along the first rail 26, substantially throughout its length.

Every second axle 38 has a wheel and bearing unit 42 on the axle adjacent the channel member 34. Every other axle 38 has an identical wheel and bearing unit 44 on the axle adjacent the channel 36. The wheels of the assemblies 42 form a first series of wheels, and the wheels of the assemblies 44 form a second series of wheels. The centerlines of the first and second series of wheels are equidistant from the centerline of the first rail 26.

Referring again to FIG. 2, the channel members 34, 36 include planar upper surfaces 46, 48, respectively, in the same plane. The channel members also include downwardly extending parallel flanges 50, 52. The flanges 50, 52 extend outward of the wheels of the assemblies 42, 44, and are parallel to the centerlines of the two wheel series.

The first rail flanges 50, 52 may extend over the second rail 28, and the wheels of 42, 44 rest on a second rail upper surface 54. The second rail 28 includes a single channel member having a planar, generally horizontal (see below) upper portion 58, two downward extending flanges 60, 62, and two inwardly turned flanges 64, 66. The flanges 60, 62 are inwardly adjacent the first rail flanges 50, 52, parallel to each other and to the flanges 50, 52. The flanges 60, 62 are equidistant from the centerline of the second rail 28.

The third rail 30 includes two elongated, mirror-image channel members 68, 70. The channel members 68, 70 extend from base flanges 72, 74 through vertically disposed, central portions 76, 78, to outwardly turned flanges 80, 82. The flanges 80, 82 are within the second rail 28, between the second rail flanges 60, 62, above the second rail flanges 64, 66, and below the second rail upper portion 58.

A series of wheel axles 84 joins the third rail channel members 68, 70 and supports a single series of wheel and bearing assemblies having wheels 86. The wheels 86 are on the centerline of the third rail 30. The wheels 86 support the second rail 28 atop the third rail 30, and thereby support the first rail 26.

The flanges 50, 52; 60, 62; 80, 82 guide movement of the rails 26, 28. The flanges 80, 82 are guiding flanges, and guide movement of the flanges 60, 62. The flanges 60, 62 are thereby guided flanges.

The flanges 60, 62 are also guiding flanges, and guide movement of the flanges 50, 52. The rail 26 is thereby guided to move along the rail 28; the rail 28 is guided to move along and captive to the rail 30.

Referring to FIG. 1, the rail assemblies 18, 20, 22, 24 are tilted from the horizontal toward the load entry and removal area 32. The unloaded first and second rails of each rail assembly roll toward the area 32 by gravity, overcoming friction of the wheels between the rails. With no load on the rails, the rails assume the position of rails 26, 28. As in FIG. 1, the first rail 26 is in the first or front load position 90 of the bay 16. Second rail 28 is in the first and second load positions 90, 92. First rail 26 abuts a first or front limit stop 96 on second rail 28; second rail 28 abuts a first or front limit stop 98 on third rail 30.

Thus, a first load placed in a load width of the bay 16 is placed on first rails such as 26.

Movement of a second load into the same load width forces the first load and its supporting first rails such as 26 to move rearward, out of the first load position 90. Movement of the first load and first rails occurs along the second rails 28, exposing the forward portions of the second rails to receive the second load. The first rails such as 26 come to rest against second limit stops such as 100 on the second rails.

Movement of a third load into the same load width forces movement of the first and second loads. Since the first rails are abutting stops such as 100 and cannot move relative to the second rails, the second rails are forced to move relative to the third rails. The second rails move rearward against limit stops such as 102, exposing forward portions of the third rails to receive the third load.

Placement of the three loads such as 104, 106, 108 within a single load width causes the rails to assume the positions of rails 110, 112, 114, as in FIG. 1. Because rails such as 26, 28 and 110, 112 move forward by gravity, removal of a forward (third) load causes the rails such as 26, 28 and 110, 112 to move forward. The second load is brought to the first load position. The first load is also brought forward, to the second load position. Removal of the second load causes the first load to be brought forward.

Figure 3:
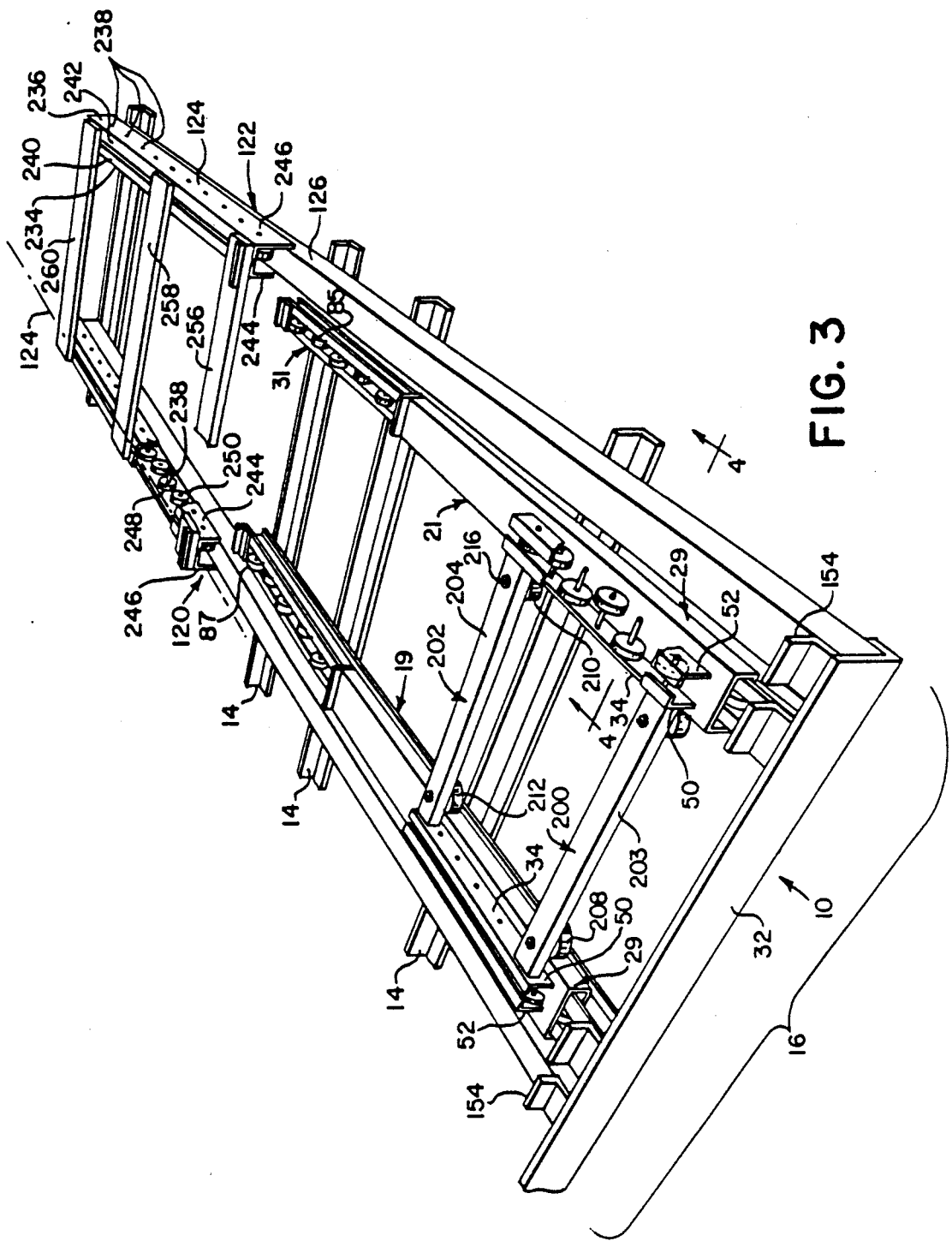
FIG. 3 is a perspective view illustrating a second preferred embodiment of the invention. An alternate mechanism of the first preferred embodiment is also shown, with some of the structure cut away to reveal the mechanism in detail.

Referring now to FIG. 3, in the second preferred embodiment of the invention, as in the first preferred embodiment, a plurality of rail assemblies 19, 21 are supported on and by beams such as 14. Outwardly adjacent and parallel to the rail assemblies 19, 21 are outer rail assemblies 120, 122.

A typical outer rail assembly 122 includes an upper outer rail 124 and a lower outer rail 126. The upper outer rail 124 is movable relative to the lower outer rail and has a single load depth or length. The lower outer rail 126 has a four load depth or length, and extends from the load entry and removal area or side 32 of the structure 10 through all load positions to the back of the fourth load position.

Figure 4:
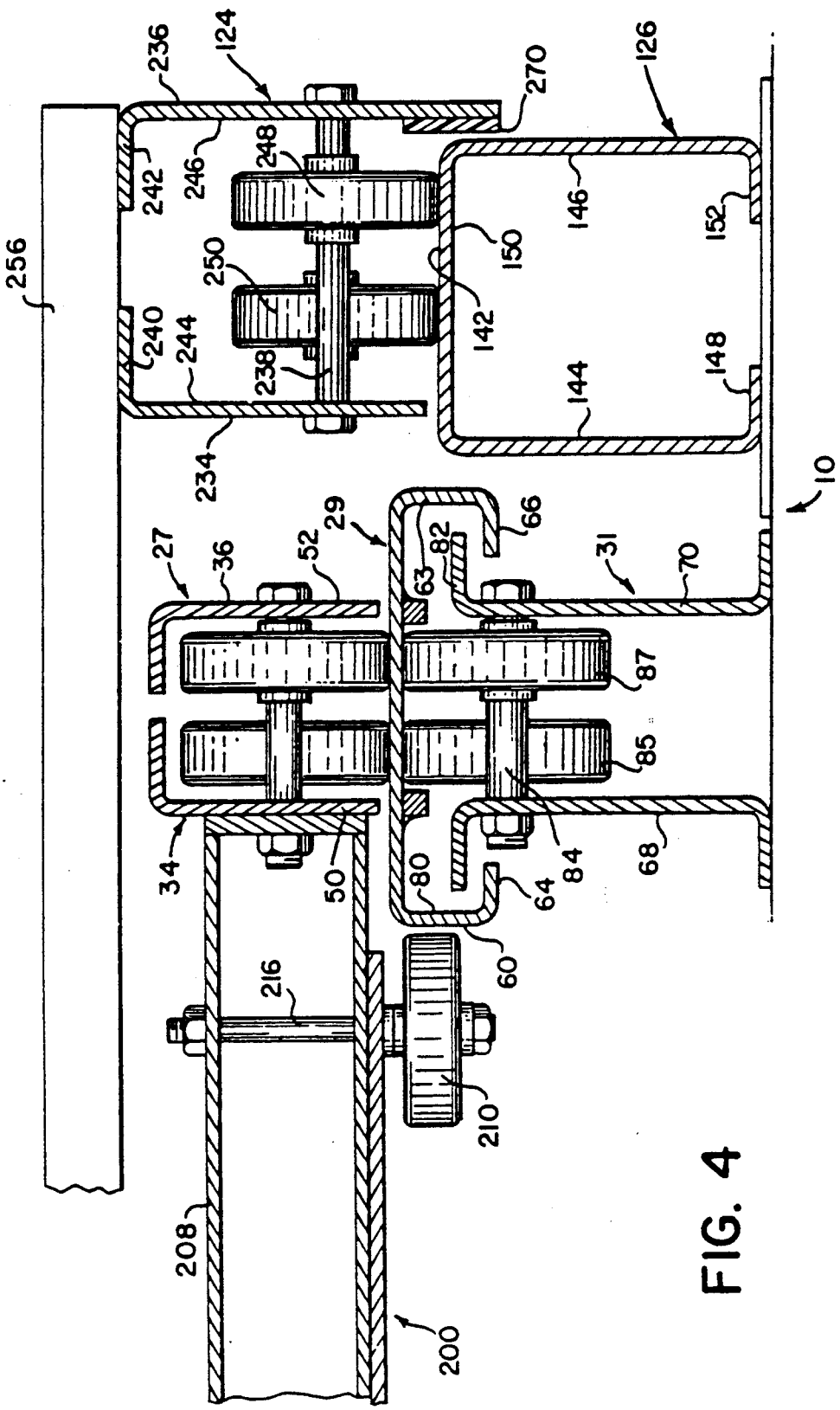
FIG. 4 is a cross-sectional view of a mechanism of the second preferred embodiment, taken along line 4—4 in FIG. 3.

Referring to FIG. 3 and FIG. 4, the upper outer rail 124 includes two elongated channel members 234, 236 joined by a plurality of wheel axles 238. As shown in FIG. 3, the channel members 234, 236 are elongated and parallel to each other and to the rail assemblies 19, 21. Channel members 234, 236 have planar, generally horizontal upper portions 240, 242 and downward extending flanges 244, 246. The flanges 244, 246 are equidistant from the centerline of the upper outer rail 124 and are joined by the wheel axles 238.

Referring primarily to FIG. 3, the flanges 244, 246 are elongated and parallel to each other and to the lower outer rail 126. The wheel axles 238 extend in a series along the upper outer rails 124, 126, substantially throughout their length. Every second axle has a wheel and bearing unit 248 on the axle adjacent the flange 246. Every other axle has an identical wheel and bearing unit 250 on the axle adjacent the flange 244. The wheels of the assemblies 248 form a first series of wheels, and the wheels of the assemblies 250 form a second series of wheels. The centerlines of the first and second series of wheels are equidistant from the centerline of the upper outer rail 124.

Referring again to FIG. 4, flange 246 extends over the lower outer rail 126 and the wheels of 248, 250 rest on a lower outer rail upper surface 142. The lower outer rail 126 includes a single channel member having a planar, generally horizontal upper portion 150, two downward extending flanges 144, 146 and two inwardly turned flanges 148, 152. The flanges 144, 146 are equidistant from the centerline of the lower outer rail 126. The lower outer rail 126 is fixed to the structure 10. A strip of a suitable friction-reducing material 270 may be disposed along the inner surface of the flange 246 adjacent the flange 146 to reduce friction and wear.

Joined to the flanges 240, 242 of the upper outer rails 124 of each pair of outer rail assemblies, as shown in FIG. 3, are cross members 256 (partially cut away for clarity), 258, 260. Each cross member 256, 258, 260 is disposed across the load width, essentially perpendicular to outer rail assemblies 120, 122.

Referring once more to FIG. 4, flange 146 is a guiding flange, and, along with the cross members 256, 258, 260, guide movement of flange 246. Flange 246 is thereby a guided flange and, with the cross members 256, 258, 260, the upper outer rail 124 is thereby guided to move along the lower outer rail 126.

Referring to FIG. 3, the rail assemblies 120, 122 are tilted from the horizontal toward the load entry and removal area 32. The unloaded upper outer rail of each assembly rolls toward the area 32 by gravity, overcoming friction of the wheels between the rails. With no load on the outer rails, the upper outer rails assume a position such that each abuts a first or front stop 154 on the lower outer rail.

Thus, a first load placed in a load width of the bay 16 is placed on the cross members 256, 258, 260 on upper outer rails such as 124. As second, third and fourth loads are moved into the same load width, on rail assemblies such as 19, 21 and in the same manner as described in the first preferred embodiment, the first load and its supporting upper outer rails such as 124 are forced to move rearward along lower outer rails such as 126.

Placement of the four loads within a single load width causes the upper outer rails to assume the position of rails 120, 122 as in FIG. 1. Because the outer rails such as 124 move forward by gravity, removal of a forward (fourth, third or second) load causes the outer rails such as 124 to move forward.

Referring again to FIG. 3 and FIG. 4, another mechanism of the first preferred embodiment is disclosed. Cross supports 200, 202 join the first rails within each load width. Each cross support comprises cross bars 203, 204 joined at each end to the innermost channel members 34 of each first rail. In this mechanism, the flanges 50, 52 do not extend over the second rail 29. One cross support 200 is disposed adjacent the front end of the first rails and is joined perpendicularly therebetween. A second cross support 202 is disposed adjacent the back end of the first rails, and is also joined perpendicularly therebetween. The cross supports 200, 202 are essentially parallel to each other. As shown in FIGS. 3 and 4, guide wheels such as 208, 210, 212 are mounted horizontally on vertical axles such as 216 beneath cross bars 203 and 204 and are disposed inwardly adjacent the interior downward extending flange 60 of each second rail.

In this alternate mechanism of the first preferred embodiment, the third rail 31 includes two series of wheels 85, 87. Every second axle 84 has a wheel and bearing unit 85 disposed adjacent the channel member 68. Every other axle 84 has an identical wheel and bearing unit disposed adjacent the channel member 70.

The flanges 60, 62; 64, 66; 80, 82 and cross supports 200, 202 guide movement of the rails 27, 29. The flanges 80, 82 are guiding flanges, and guide movement of the flanges 64, 66. The flanges 64, 66 are thereby guided flanges.

Cross supports 200, 202 guide rail 27 to move along the rail 29; the rail 29 is guided to move along and captive to the rail 31.

The preferred embodiments and the invention are now described in such full, clear, concise and exact terms as to enable a person of skill in the art to make and use the same. To particularly point out and distinctly claim the subject matter regarded as invention, the following claims conclude this specification.

What is claimed is:

1. A storage rack structure comprising:

rack supports defining a storage bay of at least three load depths, at least one load height and width, and a load entry and removal area; and at least two rail assemblies per load width on the rack supports in the storage bay;

each rail assembly including a first load supporting rail of at least a single load depth, a second load supporting rail of at least a double load depth, and a third load supporting rail of at least three load depths, the first rail movably mounted on the second rail and the second rail movably mounted on the third rail;

each rail assembly being tilted downward toward the load entry and removal area;

a plurality of wheels in at least one linear series on the third rail, the wheels rollably supporting the second rail, the first rail and any loads thereon, on the third rail;

opposed guiding flanges on the third rail extending along the linear series of wheels on the third rail, the second rail having a pair of guided flanges mating with the guiding flanges and guiding the movement of the second rail along the third rail;

a plurality of wheels in two linear series on the first rail, the wheels rotatably supporting the first rail and any loads thereon on the second rail;

opposed guiding flanges on the second rail extending along the second rail, the first rail having a pair of guided flanges mating with the guiding flanges on the second rail and guiding the movement of the first rail along the second rail;

the first rail and second rail being balanced on the wheels rollably supporting the second rail;

the first and second rails being movable by gravity toward the load entry and removal area with the removal of the loads from the second and third rails, respectively; and the first and second rails being pushable from the load entry and removal area after being loaded to facilitate loading of the third rail.

2. A storage rack structure as in claim 1 further comprising at least two outer rail assemblies on the rack supports in the storage bay;

each outer rail assembly including a first load supporting outer rail of at least a single load depth, movably mounted on a second outer rail of at least four load depths; and each outer rail assembly located outwardly adjacent to, and parallel to, a rail assembly.

3. The improved storage rack structure of claim 2 wherein each wheel in each series of wheels is mounted on a non-cantilevered axis.

4. The improved storage rack structure of claim 2 in which each wheel is mounted on an axle supported between parallel channel members.

5. A storage rack structure as in claim 1 further comprising at least two outer rail assemblies on the rack supports in the storage bay;

each outer rail assembly located outwardly adjacent to, and parallel to, a rail assembly;

each outer rail assembly including an upper load supporting outer rail of at least a single load depth and a lower outer rail of at least four load depths, the upper outer rail movably mounted on the lower outer rail;

each outer rail assembly being tilted downward toward the load entry and removal area;

a guiding flange on the lower outer rail, the upper outer rail having a guided flange mating with the guiding flange, guiding the movement of the upper outer rail along the lower outer rail;

at least one cross member joined to the upper outer rails of each outer rail assembly and extending essentially perpendicular to the rail assemblies across the load width;

a plurality of wheels in two linear series on the upper outer rails, the wheels rotatably supporting the upper outer rail and any loads thereon on the lower outer rail;

the upper outer rail being balanced on the wheels rollably supporting the lower outer rails;

the upper outer rail being movable by gravity toward the load entry and removal area; and the upper outer rail being pushable from the load entry and removal area.

6. A storage rack structure as in claim 1 further comprising a cross support fastened to the first rail, having a guide wheel rotatably mounted to the cross support to guide the movement of the first rail along the second rail.

7. The improved storage rack structure of claim 1 wherein each wheel in each series of wheels is mounted on a non-cantilevered axis.

8. The improved storage rack structure of claim 1 in which each wheel is mounted on an axle supported between parallel channel members.

9. The improved storage rack structure of claim 1 in which each second rail is a single channel member.

10. The improved storage rack structure of claim 1 in which each third rail comprises mirror-image channel members.

11. A storage rack structure comprising:

rack supports defining a storage bay of at least three load depths, at least one load height and width, and a load entry and removal area; and at least two rail assemblies per load width on the rack supports in the storage bay;

each rail assembly including a first load supporting rail of at least a single load depth, a second load supporting rail of at least a double load depth, and a third load supporting rail of at least three load depths, the first rail movably mounted on the second rail and the second rail movably mounted on the third rail;

each rail assembly being tilted downward toward the load entry and removal area;

a plurality of wheels in at least one linear series on the third rail, the wheels rollably supporting the second rail, the first rail and any loads thereon, on the third rail;

opposed guiding flanges on the third rail extending along the linear series of wheels on the third rail, the second rail having a pair of guided flanges mating with the guiding flanges and guiding the movement of the second rail along the third rail;

a plurality of wheels in two linear series on the first rail, the wheels rotatably supporting the first rail and any loads thereon on the second rail;

a cross support comprising at least one guide member joined to the first rail and having a guide wheel mounted horizontally underneath the guide member inwardly adjacent the second rail;

the first rail and second rail being balanced on the wheels rollably supporting the second rail;

the first and second rails being movable by gravity toward the load entry and removal area with the removal of the loads from the second and third rails, respectively; and the first and second rails being pushable from the load entry and removal area after being loaded to facilitate loading of the third rail.

* * * * *